United States Patent
Aggarwal et al.

(10) Patent No.: US 6,356,879 B2
(45) Date of Patent: Mar. 12, 2002

(54) CONTENT BASED METHOD FOR PRODUCT-PEER FILTERING

(75) Inventors: Charu C. Aggarwal, Yorktown Heights; Philip S. Yu, Chappaqua, both of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/169,029

(22) Filed: Oct. 9, 1998

(51) Int. Cl.[7] ............................................... G06F 17/60
(52) U.S. Cl. .............................. 705/26; 705/27; 707/3; 707/102
(58) Field of Search .......................... 705/14, 10, 26, 705/74, 27; 709/219; 455/4.2; 707/3, 102

(56) References Cited

U.S. PATENT DOCUMENTS

| | | | | |
|---|---|---|---|---|
| 4,996,642 A | * | 2/1991 | Hey | 705/27 |
| 5,583,763 A | * | 12/1996 | Atcheson et al. | 705/8 |
| 5,704,017 A | * | 12/1997 | Heckerman et al. | 706/20 |
| 5,754,938 A | * | 5/1998 | Hertz et al. | 455/4.2 |
| 5,867,799 A | * | 2/1999 | Lang et al. | 707/1 |
| 5,884,282 A | * | 3/1999 | Robinson | 705/27 |
| 5,918,014 A | * | 6/1999 | Robinson | 707/219 |
| 5,983,214 A | * | 11/1999 | Lang et al. | 707/1 |
| 6,006,218 A | * | 12/1999 | Breese et al. | 707/3 |
| 6,041,311 A | * | 3/2000 | Chislenko et al. | 705/27 |
| 6,049,777 A | * | 4/2000 | Sheena et al. | 705/10 |
| 6,064,980 A | * | 5/2000 | Jacobi et al. | 705/26 |
| 6,092,049 A | * | 7/2000 | Chislenko et al. | 705/10 |
| 6,266,649 B1 | * | 7/2001 | Linden et al. | 705/26 |

FOREIGN PATENT DOCUMENTS

| | | | |
|---|---|---|---|
| EP | 0643359 A2 | * | 3/1995 |
| EP | 751471 A1 | | 1/1997 |
| EP | 0751471 A1 | * | 2/1997 |
| WO | WO9529451 | * | 11/1995 |
| WO | WO 9833135 | | 7/1998 |

OTHER PUBLICATIONS

Lee et al "Learning Automated Product Recommendations Without Observable Features"; Apr. 1995; The Robotics Institute Carnegie Mellon University.*

"Autonomy—Knowledge Management and New Media Content Solutions", www. autonomy.com/valueprosition.html, Aug. 6, 1999.

"Providing Intelligent Online Customer Management During the Entire Customer Life Cycle", www.aptex.com/Products/services.htm, Aug. 6, 1999.

Dan R. Greenberg, Ph.D. "Building Consumer Trust with Accurate Product Recommendations", A White Paper on Like Minds WebSell 2.1.

Upendra Shardanand and Pattie Maes "Social Information Filtering: Algorithms for Automating "Word of Mouth" ", MIT Media–Lab.

"Recommendation Engine (Version 4.0)", Net Perceptions™, info@netperceptions.com.

* cited by examiner

*Primary Examiner*—Tariq R. Hafiz
*Assistant Examiner*—Romain Jeanty
(74) *Attorney, Agent, or Firm*—F. Chau & Associates, LLP

(57) ABSTRACT

The present invention derives product characterizations for products offered at an e-commerce site based on the text descriptions of the products provided at the site. A customer characterization is generated for any customer browsing the e-commerce site. The characterizations include an aggregation of derived product characterizations associated with products bought and/or browsed by that customer. A peer group is formed by clustering customers having similar customer characterizations. Recommendations are then made to a customer based on the processed characterization and peer group data.

20 Claims, 5 Drawing Sheets

CONTENT BASED METHOD FOR PRODUCT-PEER FILTERING

BACKGROUND OF THE INVENTION

1. Field of Invention

The present invention relates to an automated computer based apparatus and method for making product recommendations over an electronic commerce network. More particularly, the invention is directed to an apparatus and method for making product recommendations based on customer user behavior.

2. Discussion of Related Art

With the recent increase in popularity of on-line shopping over the Internet, entities providing the shopping sites are interested in obtaining information on shoppers that would help in selling their products. The traditional customer or market surveys used in obtaining such information are applicable and usable for the providers. Companies such as Likeminds, Inc. (www.likeminds.com) and Firefly Network, Inc. (www.firefly.com) provide survey information which are based on explicit ratings by customers, commonly referred to in the art as recommendation engines using 'collaborative filtering'. The use of engines based on ratings have particular applicability in products which are uniform and of a particular type. For example, in the case of Likeminds, customers are asked to provide ratings for preferences for products such as compact discs, based on their degrees of likes or dislikes. These ratings are then collected and archived for later use. At some point in the future a product recommendation will be made to a new customer based on the previously archived data of other customers. Recommendations made based on past explicit ratings by customers are known as 'collaborative filtering'.

The collaborative filtering approach does not work well if the customers do not participate in the explicit ratings of products. A customer or purchaser in an e-commerce environment typically prefers to minimize his time on-line and is usually unwilling to spend extra time, especially in rating products, on-line or otherwise.

Other companies offer 'content-based' filtering which uses extracted texts and information from e-commerce websites.

An example is the intelligent infrastructure offered by Autonomy, Inc. (www.autonomy.com) . This system provides an Agentware content server, which is a scaleable content personalization and organization engine for Internet information providers. This technique extracts key concepts from documents and websites to automate the categorization, cross-referencing, hyperlinking, and presentation of the information. The customer profiling system of this software enables information and service providers to understand the interests of customers and deliver personalized information.

Another company which provides intelligent servers is Aptex Software (www.aptex.com). Aptex uses a 'Content Mining' method which automatically analyzes text and other unstructured content to make intelligent decisions and recommendations.

Net Perceptions is still another company (www.netperceptions.com) which uses (Grouplens) implicit or explicit ratings of products to provide recommendations. Implicit ratings refer to the set of products bought or browsed by a customer.

Despite the provision and availability of the above described intelligent servers, a need still exists for a method or system for facilitating characterization of customers and products on the basis of customers' natural browsing/purchasing behavior, without resorting to explicit group product ratings, and providing recommendations based on peer group categorization, affording substantial customer personalization to the product recommendation process.

SUMMARY OF THE INVENTION

It is therefore an object of the present invention to provide a system and a method of using characterizations of products and user behavior, including user browsing or purchasing behavior, to generate product recommendations at an e-commerce site.

It is another object of the present invention to utilize the characterizations to create peer groups to personalize the recommendation to users. A peer group is a collection of customers whose product preferences have been previously archived and whom display a pattern of product preferences similar to that of the new customer.

The above objectives are accomplished by a method according to the present invention, which provides product recommendations to customers in an e-commerce environment, comprising the steps of: deriving product characterizations from each of a plurality of products; creating individual customer characterizations on each of the customers based on usage of the product characterizations by each of the respective customers; clustering based on similarities in the customer characterizations, to form peer groups; categorizing individual customers into one of the peer groups; and making product recommendations to customers based on the customer characterizations and the categorized peer groups.

The step of creating customer characterizations preferably includes extracting product characterizations when the customers browse or purchase the products, and the step of creating customer characterizations may include concatenating each of the product characterizations of all products browsed or purchased by an individual customer.

Preferably, the product characterizations are derived from text characterizations of each of the products and may further include the steps of: finding the frequency of occurrence for each word in the text descriptions; dividing the total frequency for each word by the frequency of occurrence for the word for all customers; finding the standard deviation for each word; selecting words having larger standard deviations; and expressing a product characterization based on the selected word.

Another method of the invention preferably include the steps of: (a) deriving product characterizations based on a current on-line session; (b) accessing historical product characterizations from memory; (c) creating a customer characterization by weighted concatenating characterizations from steps (a) and (b); (d) computing a cluster centroid for each of the peer groups; (e) selecting the peer groups whose cluster centroid is closest to the characterization created in step (c); and (f) generating one of product, peer and profile recommendations based on the selected peer group. The cluster centroid may be computed by concatenating text characterizations of all customer characterizations in each peer group, and the recommendations may comprise a weighted concatenation of text-characterizations of products bought and browsed in the current on-line session.

A system according to the present invention provides, a computer having a processor and stored program for causing the computer to interact with customers in an e-commerce environment and to provide answers to customer inquiries, the stored program comprises: means for deriving product characterizations for a plurality of products, means for creating customer characterizations based on usage of the product characterizations by the customers, means for clustering, based on similarities in the customer characterizations, for forming a plurality of peer groups, means for placing individual customers into one of the peer groups, and means for providing answers to the customer queries based on the customer characterizations and information from the peer groups.

The system preferably includes storage for archiving the customer characterizations.

The stored program further includes means for creating present customer characterizations for a currently on-line customer based on a concatenation of data extracted from usage of product characterizations by the currently on-line customer.

The stored program further includes means for placing a currently on-line customer in one of the peer groups based on similarities in the present customer characterizations and stored characterizations.

The means for deriving product characterizations preferably includes means for extracting text descriptions associated with the products.

The means for providing answers preferably includes means for recommending products to an individual customer based on product characterizations from products browsed by the individual customer in a current session.

The means for providing answers preferably includes means for recommending products to an individual customer based on a weighted frequency of historic product characterizations and a weighted frequency of present product characterizations from products browsed by the individual customer in a current session.

The means for providing answers also preferably includes means for recommending products to an individual customer based on historic product characterizations.

DETAILED DESCRIPTION OF PREFERRED EMBODIMENTS

The present invention can be generally characterized as comprising two stages; a pre-processing stage followed by an on-line querying stage. The pre-processing stage generally comprises converting text descriptions of products available at an e-commerce site into concise product characterizations. For purposes of this disclosure, the term 'characterization' can be described as a set of words with appropriate weights. The weights are defined by the frequency of occurrence of the words in the text descriptions of the products. The characterizations can be used as indicators of customer behavior. For example, for an application in which movies are being recommended to a customer, the valuable product characterizations may refer to text describing the actors and actresses along with the class of the movie.

Once the product characterizations are created individual customer characterizations are then created. A customer characterization is created by concatenating each of the product characterizations of all products which were either bought or browsed by that customer. For purposes of the present invention, concatenations can be described as a process of adding the sets of words and weights to form longer characterizations. For example, given characterization 1: heavy (1), metal (1), SONY (2); and characterization 2: SONY (1) Music (3), the concatenation of the two characterizations gives the following characterization:

A Concatenated Characterization:
 heavy (1) metal (1) SONY (3), Music (3).
The numbers in brackets correspond to the weights.

Peer groups of customers can then be formed by clustering the customer characterizations; generally, customers exhibiting likeminded buying/browsing habits are clustered into a peer group. Once the clusters are generated the pre-processing stage is complete. The pre-processing stage is performed at prespecified timed intervals to generate the text characterizations and clusters. Clusters are used to respond to the queries posed at the on-line query stage.

The on-line query stage follows the pre-processing stage and generally comprises one or more customers making queries to a server over a network. The server in turn computes the results of the queries and returns them to each respective customer.

Figure 1:
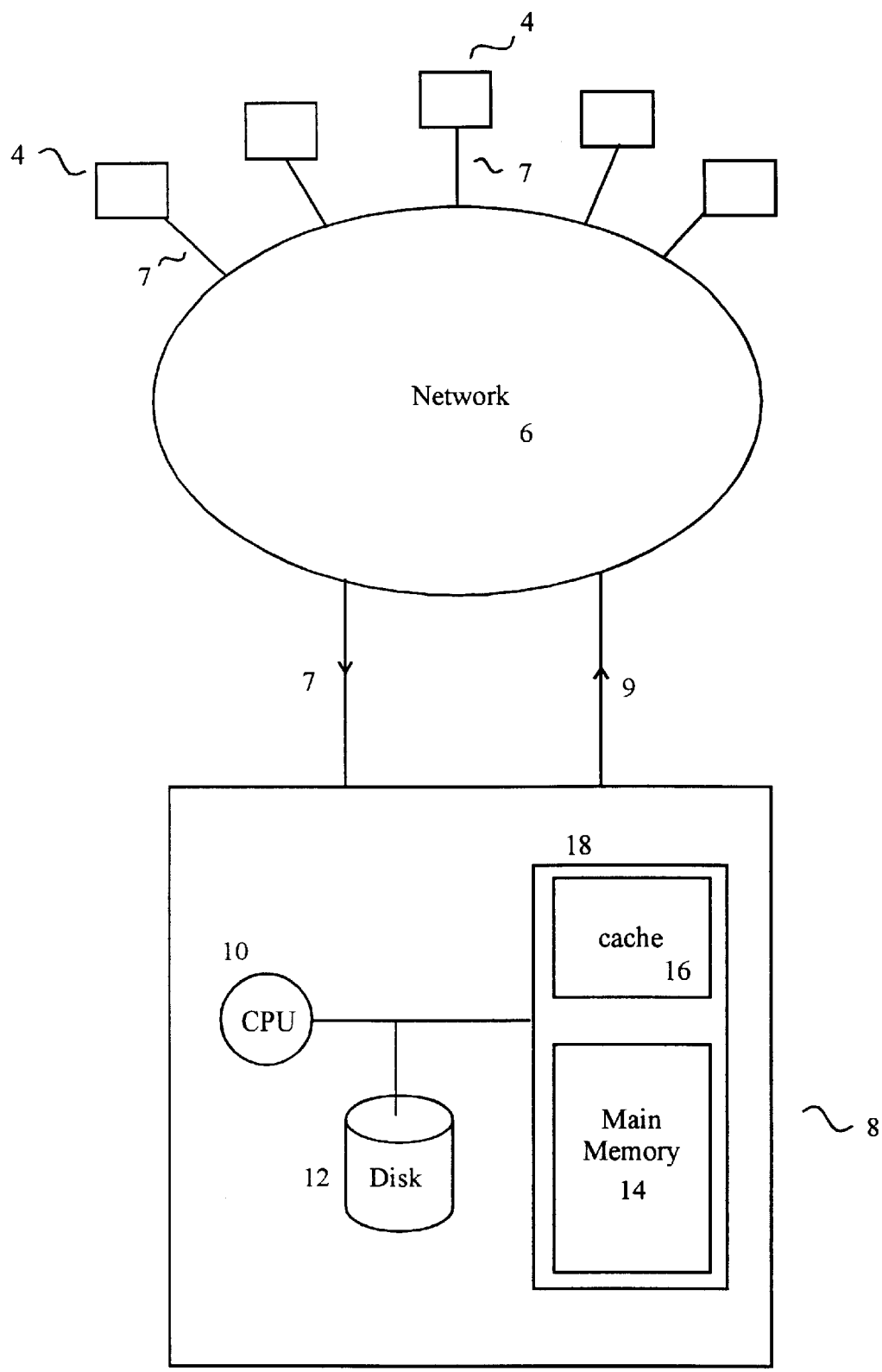
FIG. 1 is a block diagram of the illustrative system according to the present invention.

Referring now to the drawings, FIG. 1 shows a preferred architecture according to an illustrative embodiment of the present invention. A server 8 is connected to multiple customers or clients 4 over a network 6. The clients make requests (queries) 7 to server 8 and server 8 responds to the requests by returning a result 9 for each query made. The network 6 is an electronic commerce network capable of facilitating product sales and purchases. The network is preferably the Internet.

The server 8 comprises a CPU 10 for coordinating and controlling server 8 and performs the necessary computations for generating a query result 9. Main memory 14 acts as a data repository for each customer 4. The customer data may also reside on disk 15 or in cache 16. When a customer characterization is derived from historical data, that historical data is retrieved from the data repository for that customer.

Figure 2:
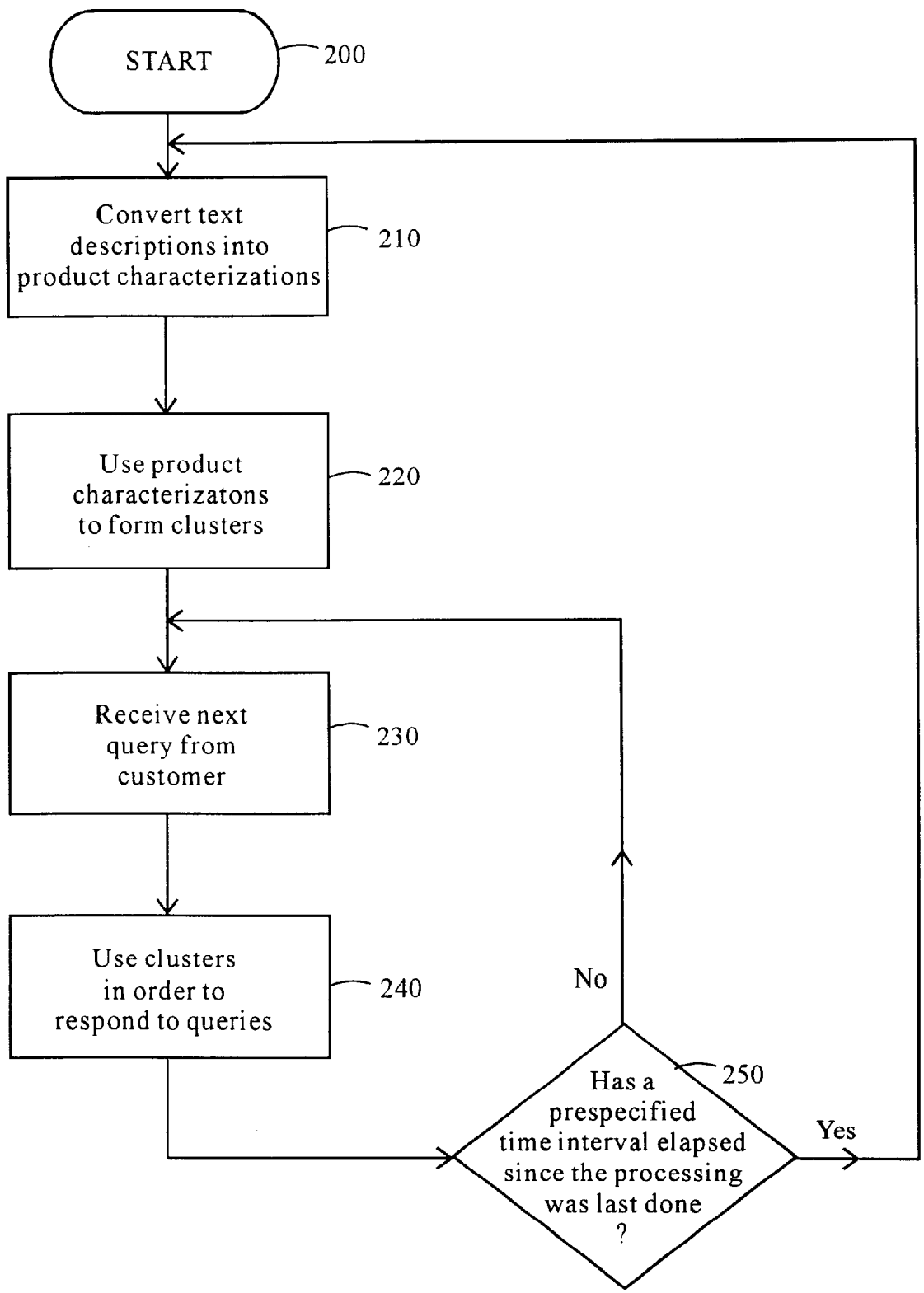
FIG. 2 is a flow diagram illustrating an example of an overall operation of the system according to the present invention.

Turning to FIG. 2, a flowchart illustrating an example of an overall operation of the present invention, having a pre-processing stage of steps 210 and 220, and an on-line querying stage of steps 230, 240 and 250.

At step 210, text descriptions associated with each product at the e-commerce site are converted into product characterizations. For purposes of the present disclosure, product characterizations are text characterizations which have been filtered to remove extraneous terminology (i.e. common language). The process of converting text descriptions into product characterizations generally includes selecting those words contained within the text description of each product offered at the e-commerce site which prove to be valuable indicators of customer behavior. For example, at a site at which movies or CDS are recommended, some examples of words with high inference power could be "action", "romance", "mystery", "drama", etc. This is because these words are highly indicative of customer behavior, and are likely to have considerable skew in their distribution across the different customers. The steps associated with creating product characterizations will be discussed in further detail below in connection with FIG. 3.

Next, at step 220, the product characterizations are used for grouping customers into clusters or peer groups. Peer groups constitute sets or clusters of customers whose purchasing/browsing characteristics closely match that of a customer for which a recommendation is to be made. Clustering algorithms are well known in the art. Preferably, the clustering method described in "System and Method for Detecting Clusters of Information," C. Aggarwal et al., a commonly assigned patent application, Ser. No. 09/070,600, filed on Apr. 30, 1998, is used to carry out the clustering operation. The disclosure of that application is incorporated by reference herein.

The on-line querying stage begins at step 230, where queries from one or more customer are received for processing. The process of receiving customer requests can be considered substantially continuous in the sense that customers may issue requests to the server at anytime or at random intervals. A customer request is received at step 230. Based on the pre-processed data (i.e. formation of peer groups or clusters) generated at the pre-processing stage a response to the customer query is generated at step 240.

At step 250, a determination is made whether a predetermined time interval has elapsed since the pre-processing stage was last performed. If the time interval has not elapsed, the process remains in the 230–250 loop responding to whatever additional user queries may exist in the queue. Otherwise, when the time interval lapses the process returns to step 210 to perform the pre-processing functions. This timing structure facilitates handling of customer queries 'on the fly'. Since the pre-processing stage is more time consuming as compared to the querying stage, the system is preferably set to perform pre-processing less frequently but whenever the on-line querying is experiencing less traffic.

Figure 3:
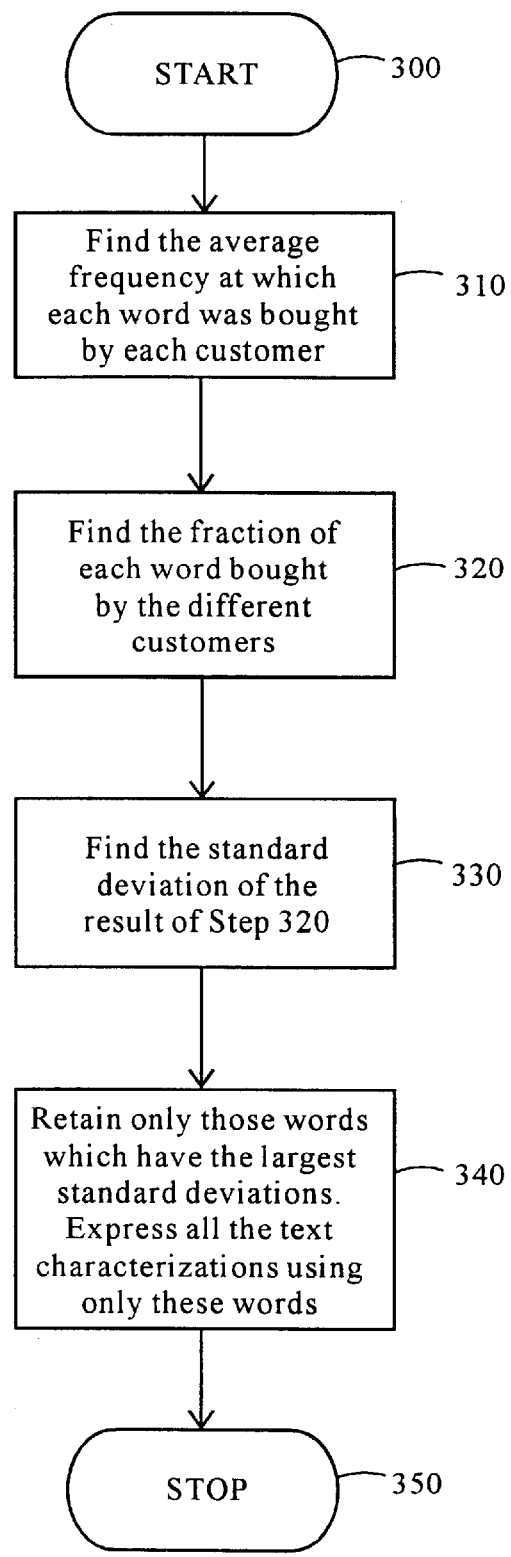
FIG. 3 is a flow diagram illustrating a method of creating product characterizations according to the present invention.

Referring next to FIG. 3, an illustrative flowchart of creating product characterizations from text descriptions (step 210) according to one embodiment of the present invention is shown. At step 310, the process determines the average frequency with which each word was bought by each customer. For purposes of the present embodiment, a word is considered bought by a customer if it occurs in the text characterization for a product bought or browsed by that customer. For example, if the same product was bought k times, then the complimentary word is also counted k times and the total frequency for that word is k. Other embodiments may consider bought words as those texts or words browsed by a customer, or by predefined combinations of browsing and buying. Each word bought by a customer is counted and summed as the total frequency. At step 320, the total frequency counts are converted into a fraction, by dividing the counts for each customer by the total frequency with which each word was "bought" by all customers, defined as F(word, customer). At step 330, a standard deviation of the fractions of words which were bought by the different customers is computed. The standard deviation for the fractions of words bought by a given customer is computed as follows:

$$\text{St. Dev. (word)} = \left\{ \left[ \sum_{1}^{N} (F(\text{word, customer}) - 1/N)^2 \right] / N \right\}^{1/2}$$

where N is the total number of customers

In general, words from a text description having low inference power (non-descriptive) will include generic words of the language (i.e. is, the, an) and will expectedly have low standard deviation values. In contrast, words which have high inference power, which might include, for example, words such as a singer=s name or a music category as part of a CD music product recommendation environment will expectedly have high standard deviation values. Those words with the highest standard deviations are selected to create a product characterization from an input text description of a product.

As an example, the original text description for a compact disc could be:
Name of CD: Whitford/St. Holmes-Whitford/St. Holmes
Label: SONY MUSIC
Genre: General
Original Release Date: 1981
Engineer: George Pappas
Producer: Tom Allom
No. of Discs: 1
Mono/Stereo: Stereo
Studio/Live: Studio
Category: Heavy Metal After performing the procedure in Flowchart 3, the characterized words are: Heavy, Metal, General, SONY, Tom, Allom. This is because these words are highly indicative of the nature of the CD, while the remaining words are simply general words. Words like Date, Label, etc. are likely to occur in each and every text description, and therefore their distribution will not be skewed, as all people are likely to browse these words regardless of "taste". On the other hand, for words like "heavy", "metal" etc., they are likely to be highly skewed in favor of people who access these words frequently.

Figure 4:
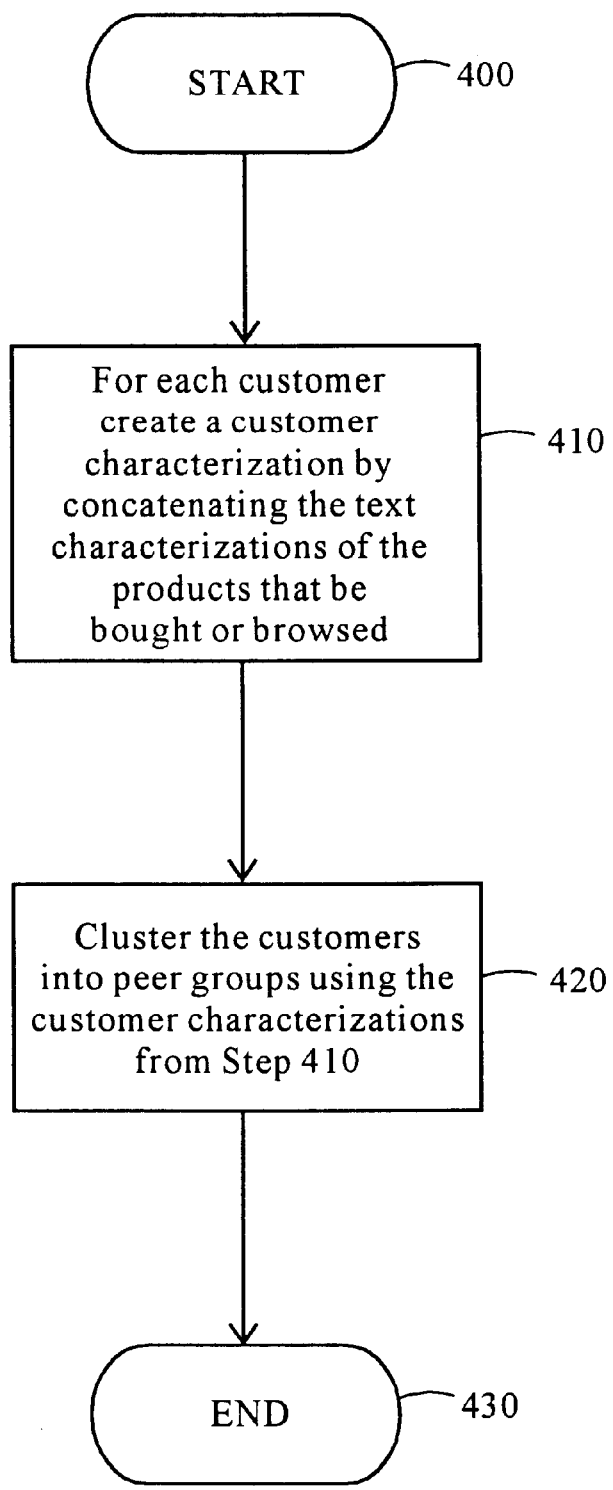
FIG. 4 is a flow diagram illustrating a method for generating customer characterizations according to the present invention.

Reference is now made to FIG. 4, an illustrative flowchart describing the steps associated with step 220 of FIG. 2, that of generating clusters (peer groups) from the generated product characterizations. At step 410, a customer characterization is created by concatenating the product characterizations for all products that the customer either bought or browsed. Concatenation in the current context means that each of the individual product characterizations bought or browsed by a customer will be appended to form one long characterization. At step 420, each customer is clustered into peer groups based on the customer characterizations formed at the previous step. The peer groups define sets of customers who exhibit similar buying/browsing behavior. For example: consider product characterizations created by the following words: chip, hardware, PC, SoftwareGames, PCGames, Joystick, processor, Aptiva, Windows98 . . . etc. In a cluster of customers having three words 'SoftwareGames, PCGames, and Joystick' occurring repeatedly signal that this cluster of customers correspond to a group of people who are interested in computer games. Note that even though Joystick, PCGames and SoftwareGames are not names of individual products, but words characterizing products, the amount of information contained in this set of words as belonging to a cluster is behavior information and certain assumptions can be made about the people in that cluster.

Figure 5:
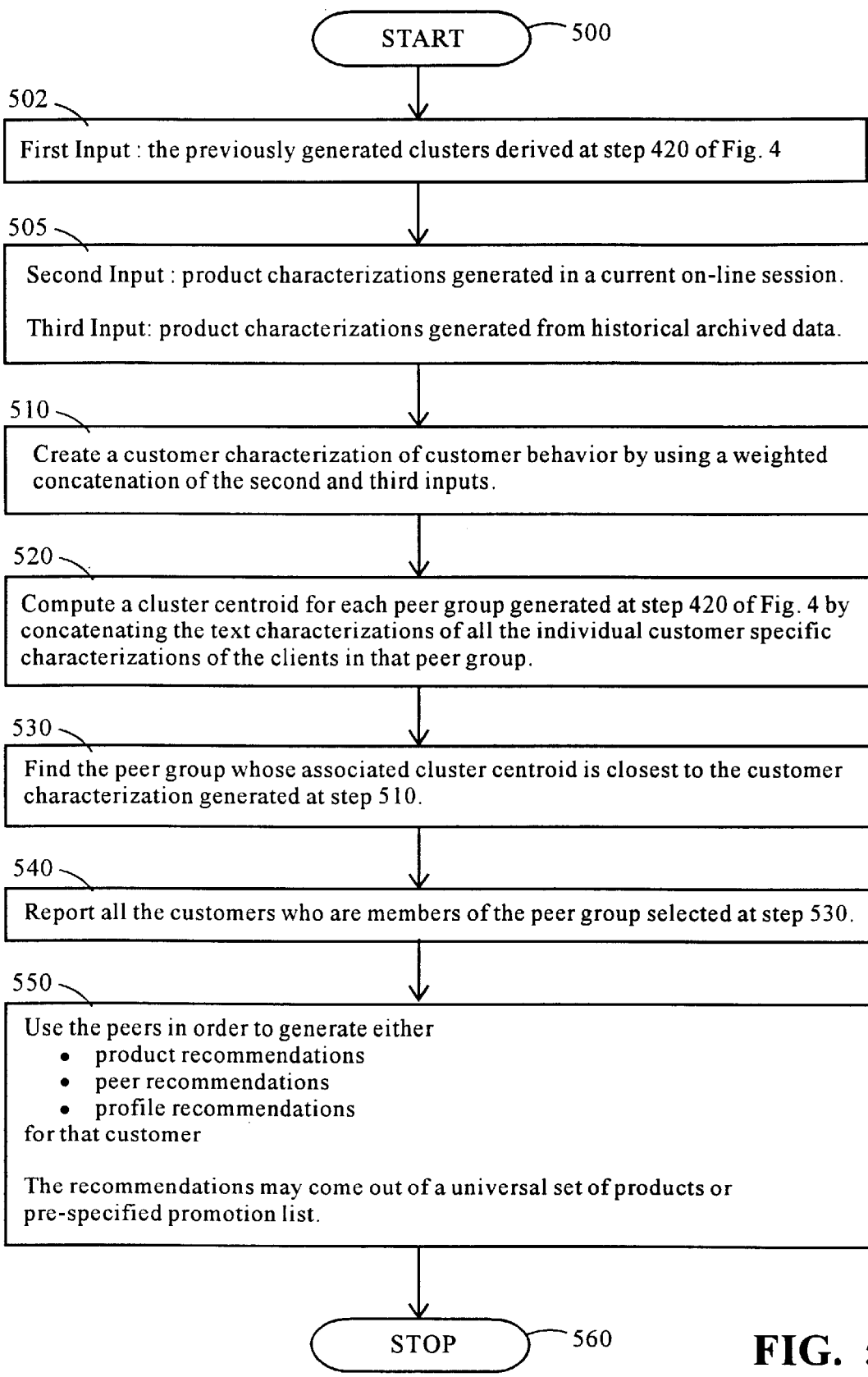
FIG. 5 is a flow diagram illustrating a method for generating recommendations according to the present invention.

Turning now to FIG. 5, a flowchart illustrating how the process responds to various queries corresponding to customer requests is provided (step 240, FIG. 2). FIG. 5 defines the on-line query stage. It is important to note that each of the process steps illustrated in FIG. 5 are described with regard to a single customer request. It can be appreciated, however, that the method can accommodate, on a first come first serve basis, a plurality of requests from one or more customers.

At step 502, a first input is received by the system which comprises all of the previously generated clusters or peer groups. Next at step 505, A second and third input, e.g., a second input buying behavior and a third input browsing behavior, are received by the process where the second input is defined as comprising product characterizations generated in a current on-line buying/browsing session. The product characterizations can be generated as specified in FIG. 3. Preferably, the generation is in real time while a customer browses/purchases products at a current on-line session. The third input, product characterizations are similar to the second input, but the product characterizations are retrieved from historical, archived data stored in main memory 14. The generated data includes product characterizations from previous browsing/purchasing on-line sessions specific to that customer.

At step 510, a customer characterization is generated for that customer. Preferably, the customer characterization is constructed utilizing the first input and clusters in conjunction with either or both the second and third inputs. When both the second and third inputs are utilized they are combined by weighted concatenation. The weighted concatenation is derived by multiplying the frequency of each word from the first and second inputs by an appropriate weight. Taking the example given above for concatenation of the CD, wherein characterization A: heavy (1), metal (1), SONY (2); and characterization B: SONY (1) Music (3), if the concatenation A is multiplied by 2, and concatenation B is multiplied by 3, the weighted concatenation is the sum of that product, yielding: heavy (2), metal (2), SONY (7), and Music (9). The weights correspond to the relative importance of the buying and browsing behavior, respectively.

At step 520, a plurality of cluster centroids are generated. A single cluster centroid is computed for each peer group generated at step 420 of FIG. 4. The cluster centroids are generated by concatenating the text characterizations of all the individual customer characterizations in that cluster (peer group). At step 530, a closest cluster centroid is found to the customer characterization derived at step 510. A "closest" cluster centroid to a customer characterization can be achieved by objective functions known to one skilled in the art.

Examples of objective functions usable for a "closeness" determination include cosine angle, the dice coefficient and the Jaccard coefficient. See "Information Retrieval, Data Structure and Algorithms", by William B. Frakes, and Ricardo Baeza-Yates, [Prentice Hall, 1992], which the use of coefficients to define similarity (i.e. closeness) is described, the disclosure therein is incorporated herein by reference. At step 540, a list of peers are found constituting those customers who are members of the cluster (peer group) whose associated cluster centroid was found to be "closest" to the customer characterization. At step 550, the peer group is utilized to respond to the queries posed in the particular e-commerce environment.

Examples of utilized queries will be described in conjunction with FIG. 5. As a further note each of the following queries requires the first input defined at step 502, however, certain of the queries may use either one or both of the inputs defined at step 505. The exemplary queries are;

1. Query

For a set of products bought/browsed, find the list of all products which form the best recommendation list.
A weighted concatenation is performed on product characterizations of the products bought/browsed by the customer in the current session (the second input). The third input representing product characterizations from historical data is not used. A report of the closest peers is made at step 540. The products with the highest frequency bought by the closest peers are then reported as the recommendations.

2. Query

For a given customer, and a set of products browsed/bought by him, find the best recommendation list.
This query is similar to query 1 except that a weighted frequency of the third input at step 505 is now utilized along with a weighted frequency of the second input.

3. Query

For a given customer, find the best recommendation list.
This query is similar to the first and second, however, only the third input from step 505 is used. In effect, the second input is discarded.

4. Query

Find the recommendation list out of a prespecified promotion list for the queries (1),(2), and (3).
This query differs from the first three in that the product recommendation list would be filtered to exclude all products except those contained on a prespecified promotion list as specified at step 550.

5. Query

Find the profile of the customers who are interested in a particular product.
This query is implemented in a way similar to that described for query 1. It differs at step 550 of FIG. 5 in that a peer distribution profile is output based on the product frequency for that peer group. A peer distribution profile is a profile of the customers in the group, such as age, sex, etc. For example, age histograms can be output.

6. Query

For a given profile of customers, find the products that they would most like.
This query contemplates customer profile queries that may take the form: For people in the 20–30 age group, what products would they most like? This query is answered by concatenating the text characterizations of all customers within the specified profile set at step 510.

7. Query

For the queries (1),(2), and (3), generate the characterizations which would be most liked by a customer, rather than the products themselves.
For this query the cluster centroid, derived at step 520, provides the required product characterizations.

8. Query

Find the closest peers for a given customer.
For this query step 530 provides the required response. Namely, a report of the customers contained within the selected centroid.

Advantageously, the illustrative method and system according to the present invention facilitates characterization of customers and products on the basis of customers natural browsing/purchasing behavior, without resorting to group product ratings. The customer characterizations become the means by which product recommendations are eventually generated thereby affording substantial personalization to the product recommendation process.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method for providing product recommendations to customers of an e-commerce web-site, the e-commerce web site having a plurality of products offered for sale there at, said method comprising the steps of:

deriving product characterizations only for products that have actually been browsed or purchased by the customers of the e-commerce web-site, the products comprised in the plurality of products, the product characterizations being based on text descriptions of the products;

creating individual customer characterizations for each of the customers based on the concise product characterizations, each of the individual customer characterizations corresponding to the products that were either browsed or purchased by a corresponding customer;

clustering the individual customer characterizations based on similarities there between to form peer groups;

categorizing each of the customers into one of the peer groups;

providing product recommendations to a given customer based on an individual customer characterization of the given customer and information from a peer group to which the given customer is categorized; and re-evaluating a previous categorization of the current session customer into one of the peer groups, based on similarities between the updated individual customer characterization of the current session customer and the individual customer characterizations of other customers.

2. The method according to claim 1, wherein said step of deriving product characterizations further includes the steps of:

(a) finding a frequency of occurrence for each word in said text descriptions of said products browsed or purchased by each of said customers;

(b) dividing the total frequency for each word by the frequency of occurrence for said word for all of said customers;

(c) finding the standard deviation for each word;

(d) selecting words having larger standard deviations; and (e) expressing a product characterization by using said selected words in said text descriptions.

3. The method of claim 1, further including the steps of:

(a) creating an individual customer text characterization by weighted concatenation of the product characterizations corresponding to said products browsed or purchased by the customer in a current session of the customer on the electronic commerce site;

(b) computing a cluster centroid for each of said peer groups;

(c) selecting the peer groups whose cluster centroid is closest to the individual customer text characterization created in step (a); and (d) generating one of product, peer and profile recommendations based on said selected peer groups.

4. The method of claim 3, wherein said cluster centroid is computed by concatenating text characterizations of all of said individual customer text characterizations in each peer group.

5. The method of claim 3, wherein the recommendations comprise a weighted concatenation of text-characterizations of products bought and browsed in said current on-line session.

6. The method according to claim 1, wherein the predefined criteria comprises removing words corresponding to a predefined list of common words.

7. The method according to claim 1, wherein the predefined criteria comprises maintaining words indicative of customer behavior and discarding all other words.

8. The method according to claim 1, further comprising the step of automatically performing said deriving, creating, and clustering steps at pre-specified time intervals to update the peer groups.

9. The method according to claim 1, further comprising the step of automatically performing said deriving, creating, and clustering steps when the e-commerce web-site is experiencing a degree of traffic less than a predefined threshold.

10. The method according to claim 1, wherein said deriving step derives the product characterizations to the exclusion of any of the plurality of products that have been offered for sale but have not browsed or purchased by the customers of the e-commerce web-site.

11. The method according to claim 1, wherein said deriving step comprises the step of excluding, from the product characterizations, any of the plurality of products that have been offered for sale but have not been browsed or purchased by the customers of the e-commerce web-site.

12. The method according to claim 1, wherein said creating step comprises, for each of the individual customer characterizations, the step of generating word/number pairs, each of the word/number pairs comprising a word that occurs in the concise product characterizations and a number of occurrences of the word.

13. The method according to claim 1, wherein said deriving step is performed in real-time as the customers browse or purchase the products offered for sale at the e-commerce web-site.

14. The method according to claim 1, wherein the product recommendations are provided independent of customer ratings.

15. The method according to claim 1, further comprising the step of filtering a product recommendation list corresponding to the product recommendations to exclude all products that are not identified on a pre-specified promotion list.

16. The method according to claim 1, wherein said method is implemented by a program storage device readable by machine, tangibly embodying a program of instructions executable by the machine to perform said method steps.

17. The method according to claim 1, further comprising the steps of:

computing a cluster centroid for each of the peer groups by concatenating text characterizations of all of the individual customer characterizations in each of the peer groups;

selecting a particular peer group having the cluster centroid closest to the new or existing individual customer characterization; and providing peer recommendations to the current session customer based on data from the particular peer group, the peer recommendations comprising names of customers who are members of the particular group.

18. The method according to claim 1, further comprising the steps of:

computing a cluster centroid for each of the peer groups by concatenating text characterizations of all of the individual customer characterizations in each of the peer groups;

selecting a particular peer group having the cluster centroid closest to the new or existing individual customer characterization; and providing at least one concise product characterization to the current session customer based on data from the particular peer group.

19. A method for providing product recommendations to customers of an e-commerce web-site, the e-commerce web site having a plurality of products offered for sale there at, said method comprising the steps of:

deriving product characterizations only for products that have actually been browsed or purchased by the customers of the e-commerce web-site, the products comprised in the plurality of products, the product characterizations being based on text descriptions of the products;

creating individual customer characterizations for each of the customers based on the concise product characterizations, each of the individual customer characterizations corresponding to the products that were either browsed or purchased by a corresponding customer;

clustering the individual customer characterizations based on similarities there between to form peer groups;

receiving a query from a current session customer;

creating and updating, in real-time, text characterizations for the products that were either browsed or purchased by the current session customer;

creating a new individual customer characterization for the current session customer based on the text characterizations, when the current session customer is new to the e-commerce web-site;

updating an existing individual customer characterization for the current session customer based on the text characterizations, when the current session customer has previously browsed or purchased at least one of the plurality of products offered for sale at the e-commerce web-site;

re-evaluating a previous categorization of the current session customer into one of the peer groups, based on similarities between the updated individual customer characterization of the current session customer and the individual customer characterizations of other customers categorizing the current session customer into one of the peer groups, based on similarities between the new or existing individual customer characterization of the current session customer and the individual customer characterizations of other customers; and responding to the query from the current session customer with at least one product recommendation, based on information from a peer group to which the current session customer is categorized.

20. A method for providing product recommendations to customers of an e-commerce web-site, the e-commerce web site having a plurality of products offered for sale there at, said method comprising the steps of:

deriving product characterizations only for products that have actually been browsed or purchased by the customers of the e-commerce web-site, the products comprised in the plurality of products, the product characterizations being based on text descriptions of the products;

creating individual customer characterizations for each of the customers based on the concise product characterizations, each of the individual customer characterizations corresponding to the products that were either browsed or purchased by a corresponding customer;

clustering the individual customer characterizations based on similarities there between to form peer groups;

receiving a query from a current session customer during a current session;

updating an individual customer characterization for the current session customer, based on the products that were either browsed or purchased by the current session customer during the current session, when the individual customer characterization for the current session customer exists prior to the current session;

re-evaluating a previous categorization of the current session customer into one of the peer groups, based on similarities between the updated individual customer characterization of the current session customer and the individual customer characterizations of other customers;

re-categorizing the current session customer into another one of the peer groups, if necessary, based on a result of said re-evaluating step; and responding to the query from the current session customer with at least one product recommendation, based on information from a peer group to which the current session customer is categorized.

* * * * *